US006733668B2

(12) United States Patent
Pedersen et al.

(10) Patent No.: US 6,733,668 B2
(45) Date of Patent: May 11, 2004

(54) APPARATUS FOR MAGNETICALLY TREATING FLOWING FLUIDS

(75) Inventors: Dwight Pedersen, Calgary (CA); Clark Humphreys, Calgary (CA)

(73) Assignee: Omni-Tech 2000 Inc. (CA)

( * ) Notice: Subject to any disclaimer, the term of this patent is extended or adjusted under 35 U.S.C. 154(b) by 28 days.

(21) Appl. No.: 10/252,700

(22) Filed: Sep. 23, 2002

(65) Prior Publication Data

US 2004/0055942 A1 Mar. 25, 2004

(51) Int. Cl.[7] .................................................. C02F 1/48
(52) U.S. Cl. ...................... 210/222; 210/695; 166/66.5; 166/304
(58) Field of Search ............................... 210/222, 695; 166/66.5, 304

(56) References Cited

U.S. PATENT DOCUMENTS

| 4,564,448 A | 1/1986 | O'Meara, Jr. |
| 5,024,271 A | 6/1991 | Meihua |
| 5,178,757 A | 1/1993 | Corney |
| 5,453,188 A | 9/1995 | Florescu et al. |
| 5,700,376 A | 12/1997 | Carpenter |

FOREIGN PATENT DOCUMENTS

| CA | 2240016 | 6/1998 |

*Primary Examiner*—David A. Reifsnyder
(74) *Attorney, Agent, or Firm*—Duane Morris LLP

(57) ABSTRACT

An apparatus for magnetically treating fluids produced from a hydrocarbon well includes a hydrocarbon section and a reactor section. The hydrocarbon section is designed to treat crude oil to inhibit the deposition of paraffins, asphaltines, and the like. The reactor section is designed to treat aqueous fluids to inhibit the deposition of mineral scale, and in particular the deposition of barium sulfate. The magnets in the two sections are arranged in a linear, co-axial relationship. Radial focusing magnets provided in the reactor section distort the magnetic field and inhibit dissolved minerals from forming scale on the production tubing. The apparatus is effective at preventing fouling by barium sulfate deposition.

20 Claims, 6 Drawing Sheets

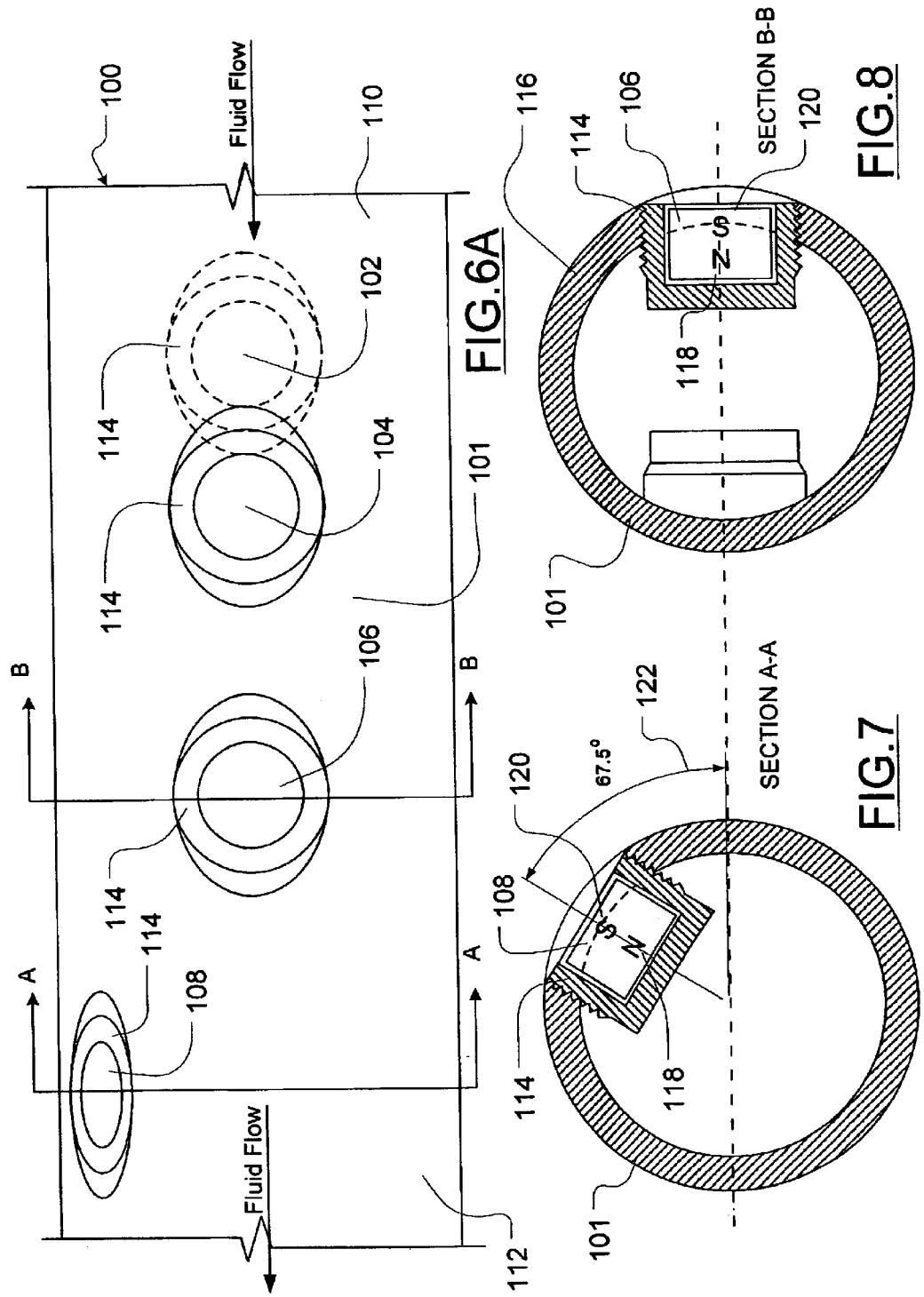

APPARATUS FOR MAGNETICALLY TREATING FLOWING FLUIDS

CROSS-REFERENCE TO RELATED APPLICATIONS

This is the first application filed for the present invention.

MICROFICHE APPENDIX

Not Applicable.

TECHNICAL FIELD

The present invention relates to an apparatus for magnetically treating fluids flowing through a conduit, and in particular, to an apparatus for inhibiting the deposition of barium sulfate scale on the inside of downhole oil production tubulars in a hydrocarbon well

BACKGROUND OF THE INVENTION

Fouling deposits in oil and gas production tubing has always been a problem to some extent. As more marginal fields are brought into production, however, the problem is exacerbated. It is well known that asphaltines and paraffins in heavy crudes tend to foul production tubing and, if untreated, may completely block the tubing. In oil and gas wells that also produce water, mineral scaling may also occur. One of the most troublesome of mineral scales is barium sulphate, due to its very low solubility. Consequently, barium sulphate is becoming an increasing problem in the flow assurance management of hydrocarbon wells.

For some years, there has been an interest in using magnetic fields to treat flowing fluids, including fluids produced from hydrocarbon wells. The preferred means for generating magnetic fields in downhole environments are permanent magnets, since they have no power supply requirement.

The concept of using permanent magnets to treat fluid flow in oil wells to improve flow assurance is well known in the art. However, the arrangement of magnetic polarity orientation and structural improvements for work efficiency are still evolving.

As an example, U.S. Pat. No. 4,564,448 which issued Jan. 14, 1986 to O'Meara, Jr., entitled Device for Treating Fluids with Magnetic Lines of Force, discloses a tool for treating fluids which includes a core magnet assembly and at least one spaced-apart and concentric elongated ring magnet assembly forming at least one annular passageway for the fluid. Each magnet assembly includes at least one tier of at least two magnetic sections arranged in coaxial lines in N—N and S—S relation in at least one permanent magnet (FIG. 1). The magnet assemblies are positioned so that the polarities of adjacent polar ends of magnetic sections in one of the magnet assemblies are unlike the polarities of the oppositely disposed adjacent polar ends of magnetic sections in a spaced-apart magnet assembly. The device described in this prior patent has a series (tier) of magnets axially oriented in the core with an annular fluid passageway around it. However, the magnetic flux fields are established as narrow radial bands between the opposite poles of magnets in the core assembly and magnets of the ring assembly (FIG. 1). Therefore, the ring magnet assembly is essential to the operability of the device.

As another example, U.S. Pat. No. 5,024,271 which issued Jun. 18, 1991 to Bait Institute of Applied Design of New Materials, entitled Permanent-Magnet Wax-Proof Device. This patent discloses a permanent magnet wax-proof tool which includes one or more than one magnetic pole pairs, each of which includes two magnetic circuit units, each unit comprising radially oriented magnets co-operating with axially or circumferentially oriented magnets or both (FIGS. 3 to 6). The second embodiment of the invention described in this patent (FIGS. 5, 6, 8 and 10) can be connected in series with a sucker rod used in pumping some oil wells. This embodiment forms a magnet core and the fluids flow around the core. The device described in this patent, and in particular as the second embodiment has axially oriented magnets in the pairs of magnetic circuits which are incorporated in a sucker rod connector and form a magnetic core, treating the fluids flowing around the core. This patent emphasizes that the main purpose of adding the axially oriented side magnets or the circumferentially oriented strip magnets, or both, to the radially oriented tile magnets is to suppress the leakage of magnetic field generated by the radially oriented tile magnets so as to significantly concentrate and thus enhance the field strength in the main area of oil flow.

As a further example, U.S. Pat. No. 5,700,376 which issued on Dec. 23, 1997 to Carpenter, is entitled Method and Apparatus for Magnetically Treating Flowing Liquids. This patent discloses an apparatus which includes a plurality of parallel spacers secured at circumferentially spaced locations to the inside of a cylindrical portion of a housing, with a series of axially spaced, first and second magnets sandwiched between the inside surface of the cylindrical portion of the housing and the outer surface of a pipe and circumferentially spaced from each other and from the spacers. The poles of the first and second magnets are oppositely oriented, so that a flux field is formed between the poles of the spaced-apart magnets.

As yet another example, U.S. Pat. No. 5,178,757 which issued Jan. 12, 1993 to Mag-Well, Inc., is entitled Magnetic, Fluid-Conditioning Tools. This patent describes a device that includes an elongated hollow core, at least one fluid passage extending longitudinally through the core, at least two longitudinally extending arrays of magnets on an exterior surface of the core on opposite sides of the fluid passage. The magnets in each array are in register across the fluid passage, each registered pair of magnets having adjacent opposite poles to provide a magnetic field substantially perpendicular to the passage. An alternate embodiment of the device has three longitudinally extending arrays of magnets with two fluid passages between them.

U.S. Pat. No. 5,453,188 which issued on Sep. 26, 1995 to Florescu et al., is entitled Magnetic Apparatus for Preventing Deposit Formation in Flowing Fluids. This patent describes an apparatus and a method for minimizing the formation of deposits of paraffin, asphaltine and scale on the surface of tubing in an oil well by increasing the turbulence of various electrically-charged microscopic particles populating crude oil colloidal suspensions, using effects of the Lorentz force which acts upon the flowing fluid. A plurality of spaced-apart permanent magnet disc assemblies are disposed perpendicularly of a fluid flowing through the tubing. The disc assemblies are specially configured to provide a unique helicoidal trajectory of the various electrically-charged microscopic particles, subjecting those particles to a prolonged exposure to an intense magnetic flux. As the fluid flows through the central passageway, the charged particles exhibit turbulent, helicoidal flow through the concentrated magnetic lines of force. A problem with this arrangement is the severe flow restriction required in the fluid flow path.

Applicant's Published Canadian Patent Application No. 2,240,016, which was filed on Jun. 8, 1998 is entitled An Apparatus For Magnetically Treating Flowing Fluids. This application discloses an apparatus for magnetically treating fluids removed from a hydrocarbon well. The apparatus includes a hydrocarbon section and a reactor section. The hydrocarbon section is designed to treat crude oil to inhibit the deposition of paraffins, asphaltines, and the like. The reactor section is designed to treat aqueous fluids to inhibit the deposition of scale, and the like. The magnets in the two sections are arranged in a linear, co-axial relationship. Radial focus magnets are provided in the reactor section to distort the magnetic field and provide radial exposure of the magnetic flux.

The devices described in the above prior patents and applications all teach magnets arranged in a radial relationship, except for the second embodiment described in U.S. Pat. No. 5,024,271 and Applicant's Canadian Patent Application. The device described in U.S. Pat. No. 5,024,271 has a magnet circuit with a complicated structure. However, none of these patents teach effective treatment of fluids to prevent formation of deposits of barium sulfate on a production tubing in an oil well without unduly restricting production flow.

Consequently, there exists a need for a simple, linear arrangement of magnets that effectively treat well fluids to inhibit the formation of deposits of barium sulfate on the surfaces of a production tubing in an oil well, while having no significant impact on fluid flow through the production tubing.

SUMMARY OF THE INVENTION

It is therefore an object of the present invention to provide an apparatus for magnetically treating fluids produced from hydrocarbon wells to inhibit deposition of barium sulfate on tubulars used to produce the fluids from the wells.

Another object of the invention is to provide an apparatus and method for magnetically treating fluids in which magnets are arranged in a axial and radial relationship so that constriction of the fluid path is minimized.

The invention therefore provides an apparatus for treating fluids flowing through a conduit. The apparatus comprises a hydrocarbon section for treating hydrocarbon flowing through the conduit, and a reactor section for treating mineral-laden water that flows through the conduit. The reactor section includes four focus magnets that are arranged to treat the water so that even low-solubility minerals such as barium sulfate do not form scale deposits in the conduit.

The four focusing magnets are arranged in a linear distribution and are respectively supported in pockets affixed to a sidewall of the reactor section. A first of the four focusing magnets is on one side of the reactor section, while a next two of the four focusing magnets are spaced apart along an opposite side of the reactor section. The fourth focusing magnet is located upstream of the other three, and radially offset from the second and third focusing magnets. The degree of offset is preferably between 45° and 67.5° from the second and third focusing magnets.

Experimental testing of the tool has demonstrated that it is very effective in inhibiting the deposit of asphaltines, paraffins and mineral scales on the sidewalls of production tubings used to produce hydrocarbons from subterranean wells. Even low-solubility minerals such as barium sulfate are effectively inhibited from forming scale on the production tubing.

Consequently, the invention provides an apparatus that is easy and economical to install, and requires no maintenance. The apparatus can provide years of effective service and, unlike chemical scale inhibitors, does not require renewal.

BRIEF DESCRIPTION OF THE DRAWINGS

The invention will now be further explained by way of example only and with reference to the following drawings, wherein:

FIG. 2b is a portion of the elongated core magnet assembly shown in FIG. 2a, schematically illustrating the flux fields generated by the core magnet assembly shown in FIGS. 1 and 2a;

FIG. 6A is a detailed schematic view of focus magnets of the reactor section shown in FIG. 6;

FIG. 7 is a cross-sectional view taken along lines A—A of the portion of the reactor section shown in FIG. 6A;

FIG. 8 is a cross-sectional view taken along lines B—B of the portion of the reactor section shown in FIG. 6.

DESCRIPTION OF THE PREFERRED EMBODIMENT

The invention relates to an apparatus for magnetically treating fluids flowing through a conduit, such as a production tubing in a hydrocarbon well to inhibit a deposit of asphaltines, paraffins, barium sulfate and other mineral scales in the tubing.

Figure 1:
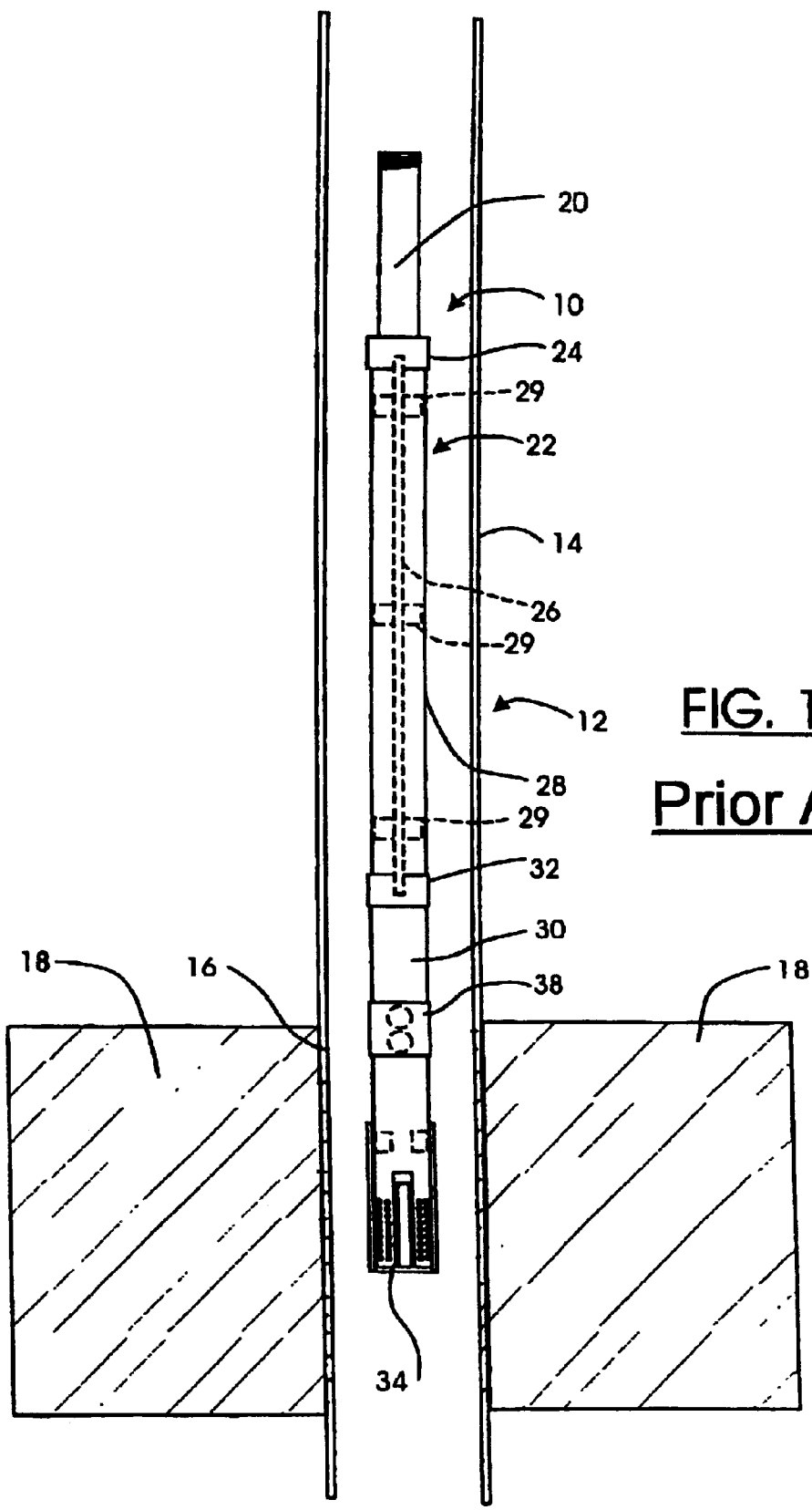
FIG. 1 is a schematic diagram of Applicant's prior art apparatus for treating fluids, in shown in a cased hydrocarbon well bore.

As described in Applicant's above-referenced Patent Application, FIG. 1 is a schematic view of Applicants prior art apparatus 10 suspended in a cased hydrocarbon well generally indicated by reference 12. As is well known in the art, the cased hydrocarbon well includes a casing 14 having a perforated area 16 in a hydrocarbon production zone 18. Typically, hydrocarbons in the form of natural gas, crude oil and water are produced simultaneously from the production zone 18. The fluids produced from the production zone 18 may also include colloidal suspensions of sand or other particulate. The fluids enter the casing 14 through the perforations 16 and are raised to the surface through a production tubing (not illustrated). The fluids commonly contain asphaltines and/or paraffins which can foul the production tubing and slow or stop production from the well. The water which is produced along with the crude oil from the production zone 18 may also be contaminated with carbonates or other dissolved minerals which can foul the perforations 16 and/or the production, tubing.

The apparatus 10 in magnetically treats fluids flowing from the production zone 18 to inhibit the formation of deposits within the production tubing, to maintain full production from the well.

The apparatus 10 includes a connector section 20 which is a "pup-joint" of production tubing used to connect the apparatus 10 to the bottom end of the production tubing through which fluids are produced from the well. The diameter of the connector section 20 is the same as the diameter of the production tubing in the well. A hydrocarbon section 22 for treating hydrocarbon fluids produced from the well is connected to the connector section 20 by a coupling 24. The hydrocarbon section 22 includes an elongated core magnet assembly 26 axially suspended within a hydrocarbon section housing 28 and centralized by three sets of hanger components 29 so that an annular passage is formed through which flow fluids produced from the well.

The apparatus 10 further includes a reactor section 30 for treating an aqueous component of fluids produced from the production zone 18. The reactor section 30 is connected to the hydrocarbon section 22 by a coupling 32. The reactor section 30 includes a reactor core magnet assembly 34, a pair of lower radial focus magnets 36 and at least one pair of upper radial focus magnets 38. The details of the construction of both the hydrocarbon section 22 and the reactor section 30 are explained below in detail.

Figure 2A:
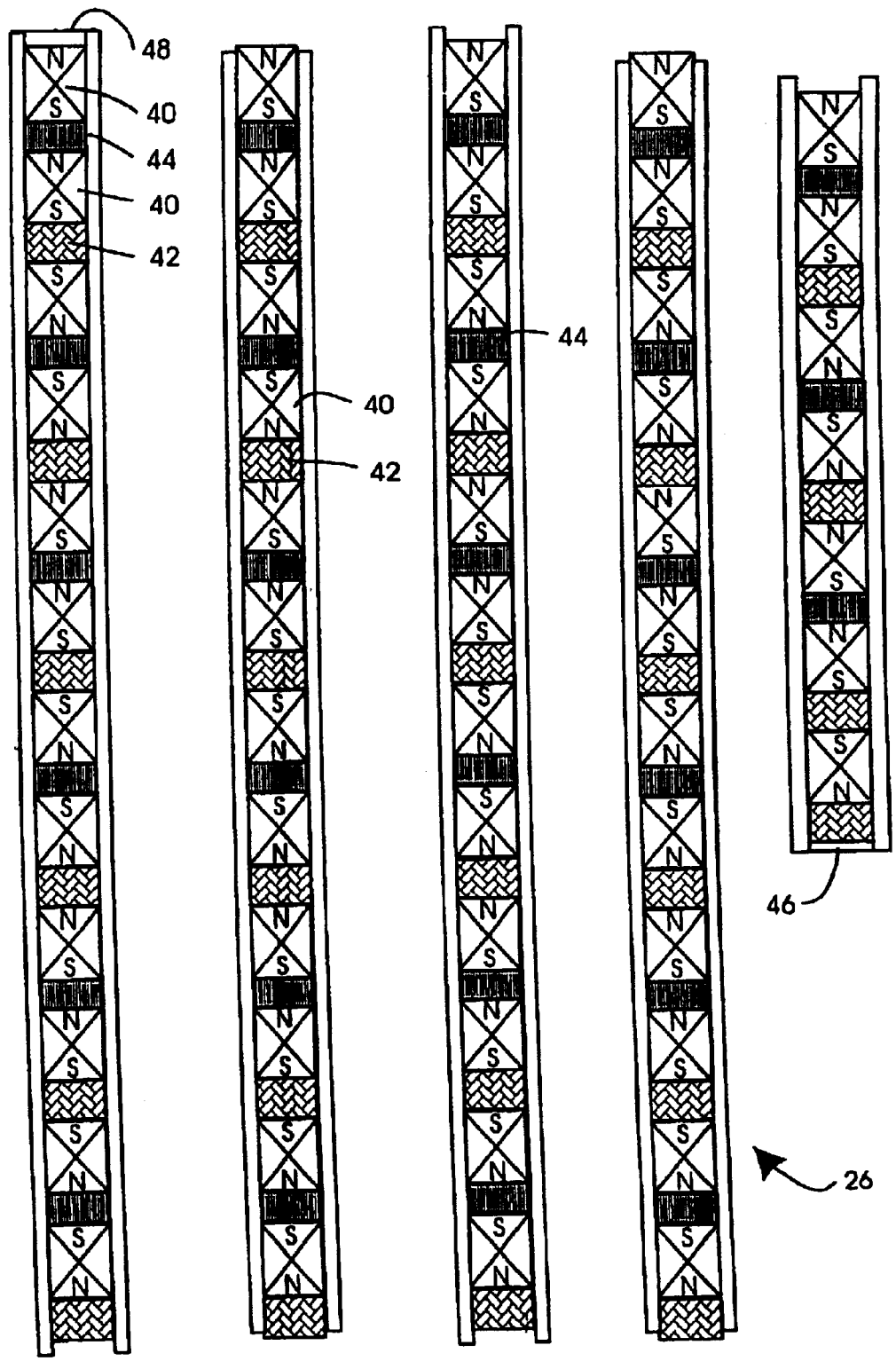
FIG. 2a is a cross-sectional segmented view of an elongated core magnet assembly used in a hydrocarbon section of the apparatus shown in FIG. 1.

FIG. 2a is a schematic cross-sectional, sectionalized view of the core magnet assembly 26 of the hydrocarbon section 22 shown in FIG. 1. The assembly shown in FIG. 2a includes 55 magnets. The number of magnets included in any core magnet assembly is preferably a function of the composition and concentration of contaminants to be treated as well as the rate of flow from a well. In general, it has been observed that heavy asphaltines require a longer treatment time, and hence a longer core magnet assembly, than lighter paraffins. It has also been observed that wells which produce fluids at a high rate of flow may require a longer core magnet assembly than wells which produce at a lower rate, depending of course on the concentration of impurities to be treated.

The core magnet assembly 26 shown in FIG. 2a includes a plurality of rare earth magnets 40. The rare earth magnets are preferably samarium-cobalt rare earth magnets available from Hitachi Corporation, for example. The strength of the magnets is preferably B-H of 19.5 MGO with coercive force $H_c$ of 8300 oerstads. In the embodiment shown in FIG. 2a, the core magnet assembly 26 includes 55 magnets 40 co-axially arranged in series, the magnets being grouped in pairs with opposite poles adjacent within each of the pairs. Adjacent pairs have like poles adjacent and are spaced apart by non-magnetic spacers 42. Each of the magnets 40 in each pair are also preferably spaced apart by a ferrous spacer 44, preferably a carbon steel. The non-magnetic spacers 42 are preferably brass. At a bottom end 46 of the core magnetic assembly 26, a single magnet 40 is preferably spaced from the last pair of magnets in the core magnet assembly by a non-magnetic space 42. The single magnet has a like pole oriented towards the last pair of magnets in order to produce a strong radial flux field through which fluids produced by the well flow as they enter the hydrocarbon section 22 of the apparatus 10. Preferably, a non-magnetic spacer 42 is also positioned beneath the lower most magnet 40 in the hydrocarbon section 22. The magnets in the core magnet assembly 26 may be bonded together using an epoxy resin or the like but are preferably contained within a core housing 48. The core housing 48 is radially supported on the inside surface of the hydrocarbon section housing 28 through the three sets of hanger components 29 and axially supported on a ring (not shown) which is welded to the bottom of the core housing 48 and wedged between the hydrocarbon section and the reactor section 30, and covered by the coupling 32. The core housing 48 is constructed of a non-magnetic material. Stainless steel is the material of choice because of its corrosion resistance to the corrosive environments commonly encountered in hydrocarbon wells.

Figure 2B:
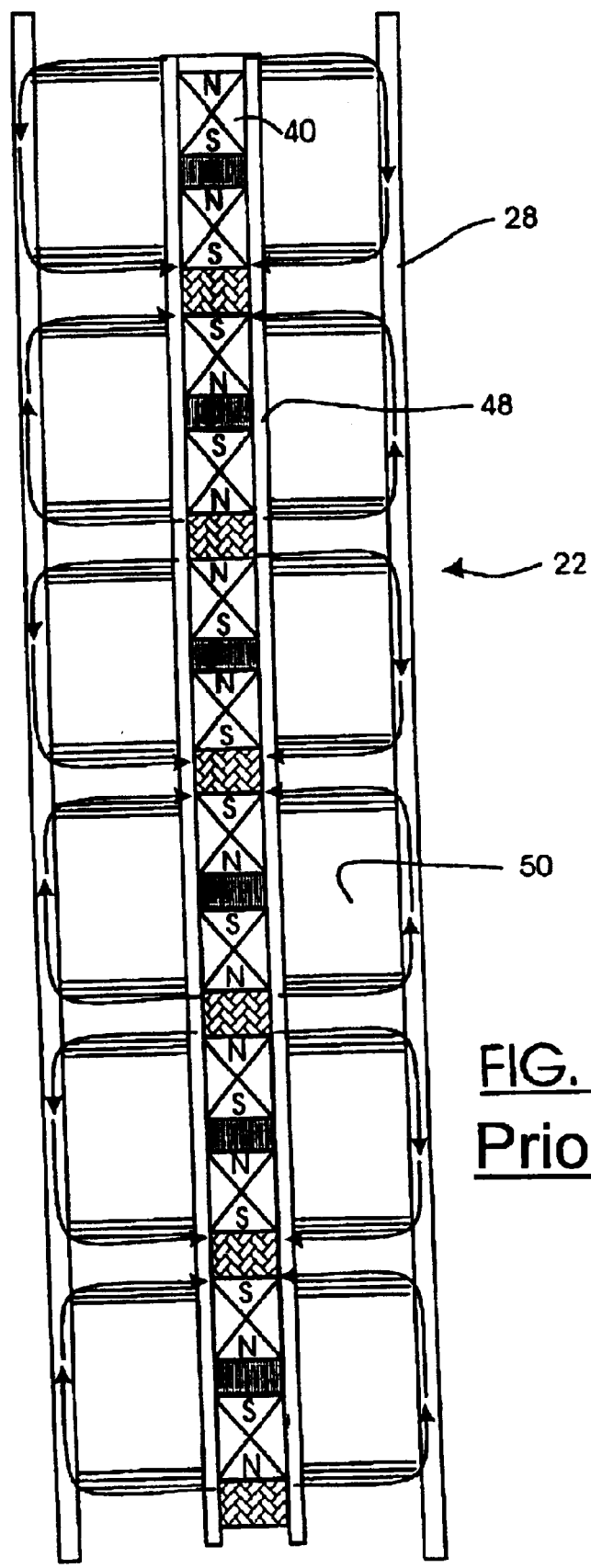

FIG. 2b is a schematic illustration of the flux fields created in the hydrocarbon section 22 of the apparatus 10. As is explained above, the hydrocarbon section includes an hydrocarbon section housing 28 which is of a magnetic material, preferably carbon steel. The arrangement of the rare earth magnets 40 within the core housing 48 creates strong radial flux fields which circulate through the hydrocarbon section housing 28 and subject fluids flowing through an annular passage 50 to magnetic treatment as described above.

Figure 3A:
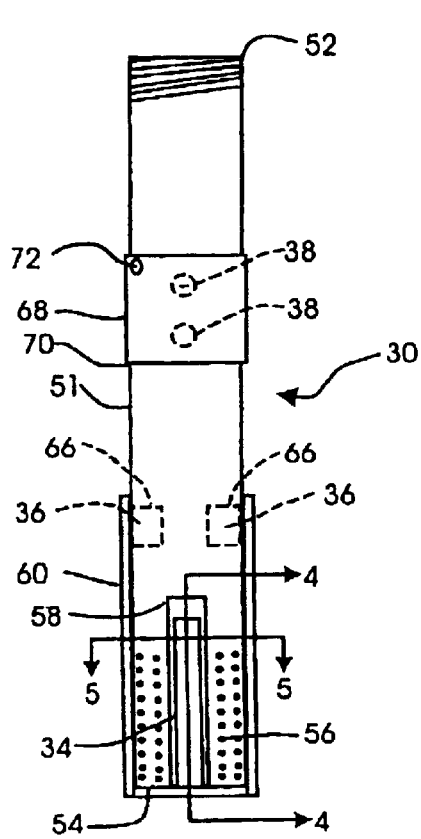
FIG. 3a is a detailed schematic view of a reactor section of the apparatus shown in FIG. 1.

FIG. 3a shows an embodiment of the reactor section 30 of the apparatus 10. The reactor section 30 includes a reactor section housing 51 having a top end 52 and a bottom end 54. The top end 52 is adapted to be coupled to the coupling 32 which is connected to a bottom end of the hydrocarbon section 28. The bottom end 54 is off-set 90° with respect to a plane coincident with the axis of the axial slots 58 and is bolted to the reactor section housing 51 of the reactor section 30. A core housing 64 (more clearly shown in FIG. 4) of the reactor core assembly 34 is preferably welded to the U-shaped bracket 60. The U-shaped bracket 60 is preferably made of a magnetic material such as carbon steel to enhance a magnetic flux field created between the lower set of radial focus magnets 36 and the reactor core magnet assembly 34.

The lower set of radial focus magnets 36 are preferably rare earth magnets which are radially oriented and supported in pockets 66 connected to an inner surface of the reactor section housing 51. The first set of radial focus magnets 36 are inserted through bores from an outside of the reactor section housing 51 into the pockets 66. A U-shaped bracket 60 retains the radial focus magnets 36 within the pockets 66. The radial focus magnets 36 are diametrically opposed and oriented in a plane that is offset 90° with respect to the axial slots 58. The lower set of radial focus magnets preferably have like poles directed inwardly. The preferred arrangement is north poles inwardly directed and south poles outwardly directed. It should be noted that the pole of the most upstream magnet in the core magnet assembly 26 (FIG. 2a), the pole of the most downstream magnet in the reactor core magnet assembly 34 (FIG. 4) and the inwardly directed poles of the focus magnets 36, 38 and 74 are all of the same polarity, namely "north".

The upper set of radial focus magnets 38 are likewise retained in pockets (not illustrated) connected to an inside surface of the reactor section housing 51. The upper pair of radial focus magnets are axially off-set from each other in a plane which is off-set 90° with respect to the pair of lower focus magnets 36. The upper set of focus magnets 38 are retained in their pockets by a sleeve 68, which preferably rests on a machined shoulder 70 and is secured by set screws 72, or the like.

The function of the pairs of focus magnets 36, 38 is to distort the magnetic flux field so that aqueous solutions are treated to keep dissolved minerals in solution.

Figure 3B:
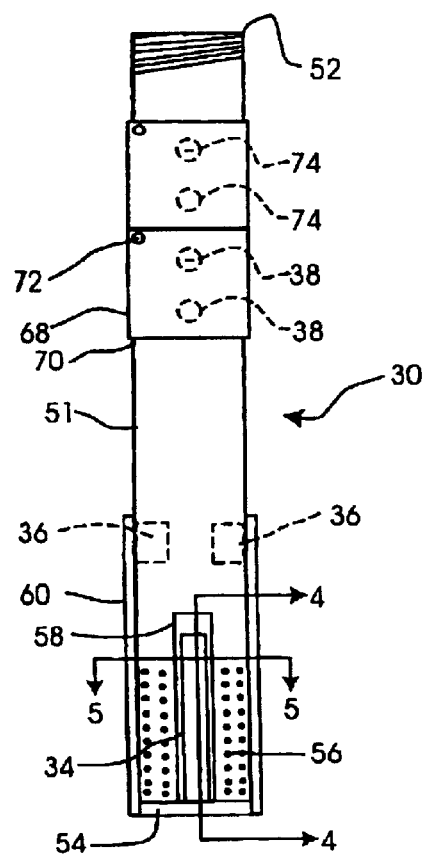
FIG. 3b is a detailed schematic view of an alternate embodiment of the reactor section of the apparatus shown in FIG. 1.

The reactor section 30 shown in FIG. 3b is identical to that shown in FIG. 3a with the exception that two pairs of upper focus magnets are provided. The embodiment shown in FIG. 3b is used for treating wells that produce aqueous fluids high in dissolved minerals and/or high concentrations of particulate such as sand, or the like. The focus magnets 74, which are most downstream are preferably oriented in the same plain as the focus magnets 38 with the exception that an upper, or the most downstream, focus magnet 74 may be off-set with respect to the other by up to about 45°. Off-sets of 12.5° and 23° are preferred. In general, experimentation has shown that the more viscous the crude oil produced from the well, or the more heavily laden with sand or other particulate, the greater the off-set required for the most downstream focus magnet 74.

Figure 4:
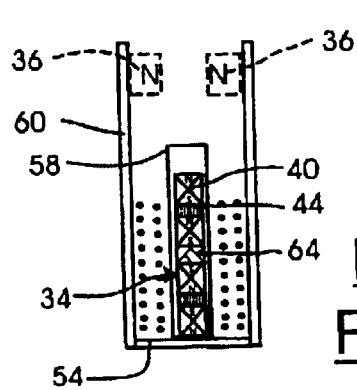
FIG. 4 is a cross-sectional view of the reactor section shown in FIGS. 3a and 3b taken along lines 4—4 of those Figures.

FIG. 4 is a cross-section of the reactor core magnetic assembly 34 taken along lines 4—4 of FIG. 3a. The reactor core magnet assembly 34 is identical in construction to the core magnet assembly 26 described above. The magnets are co-axially arranged in series, the magnets being grouped in pairs with opposite poles adjacent in each of the pairs and adjacent pairs having like poles adjacent. Each of the pairs are separated by a nonmagnetic spacer 42 which is preferably brass. Each of the magnets in each pair are separated by a ferrous spacer 44, preferably carbon steel. The reactor core magnet assembly 34 is contained within a reactor core housing 64 of a non-magnetic material such as stainless steel. The reactor core magnet assembly 34 preferably includes 4 rare earth magnets 40, although more magnets may be added if the aqueous component of production fluids is very high in dissolved minerals.

Figure 5:
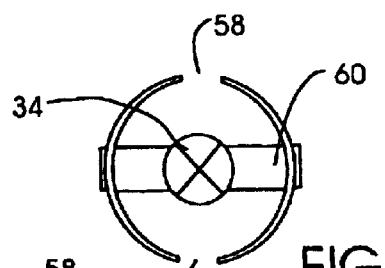
FIG. 5 is a cross-sectional view of the reactor section shown in FIGS. 3a and 3b, taken along lines 5—5 of those Figures.

FIG. 5 is a cross-sectional view taken along lines 5—5 of FIG. 3a. As explained above, the U-shaped bracket 60 extends across the bottom end 54 of the reactor section 30. It supports the reactor core magnet assembly 34, which is preferably welded to the U-shaped bracket 60. The pair of. axial slots 58 are off-set at 90° to the U-shaped bracket 60, as described above.

Figure 6:
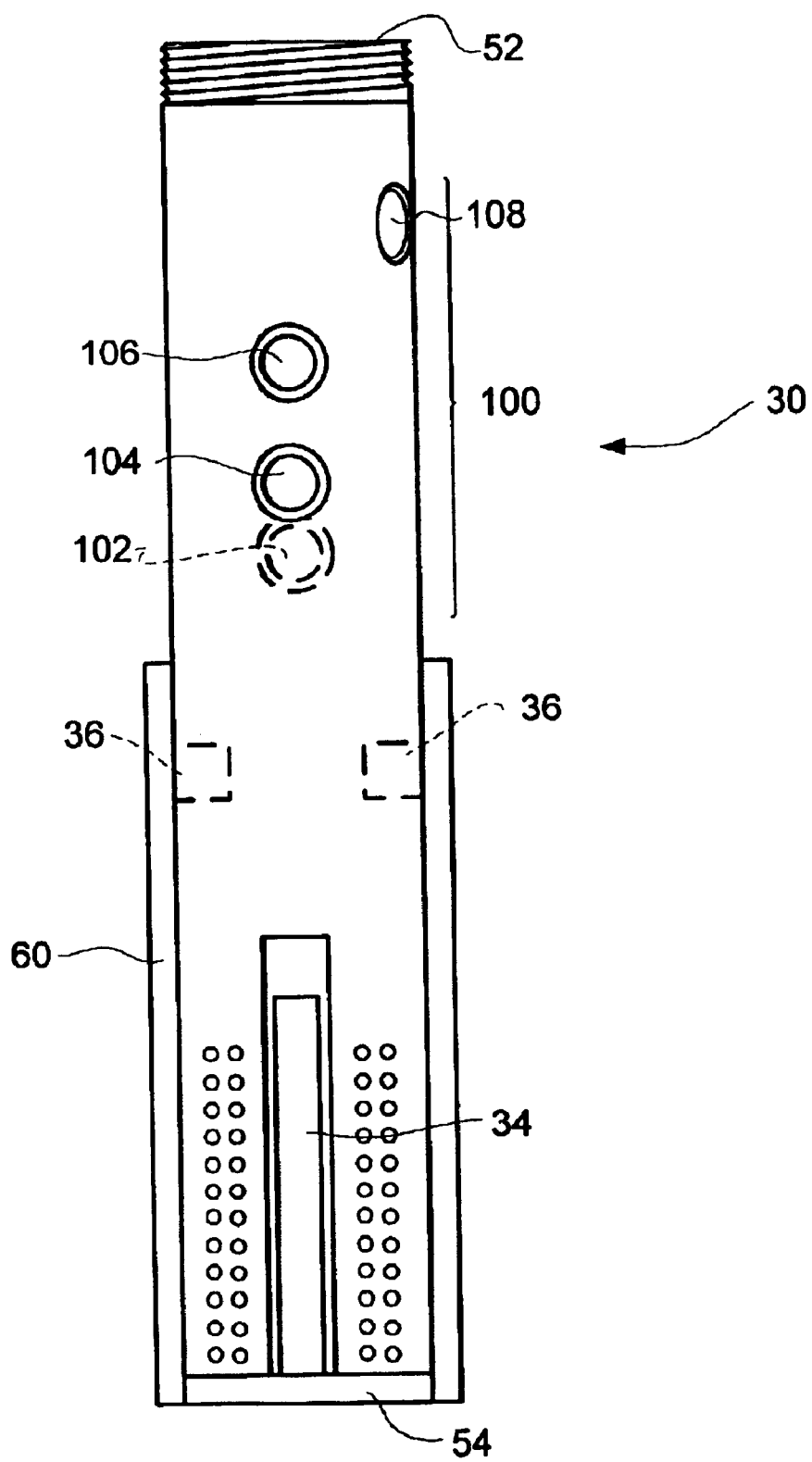
FIG. 6 is a detailed schematic view of a reactor section of the apparatus in accordance with the invention.

FIG. 6 is a schematic diagram of a reactor section of an apparatus 10 in accordance with the invention. The apparatus 10 is identical to that described above with reference to FIGS. 1–5, with the exception that a location and orientation of the upper focusing magnets has been changed in order to provide an apparatus that is effective in inhibiting the deposition of mineral scales produced by even low-solubility minerals such as barium sulfate, which normally require chemical treatment to remove an/or inhibit disposition of the scale. The upper focusing magnets 100 in accordance with the invention include four focusing magnets, the location and orientation of which are explained below with reference to FIG. 6A. The four focusing magnets 100 are retained in their pockets as explained above with reference to FIG. 3 by a sleeve 68, which preferably rests on a machined shoulder 70 and is secured by set screws 72 (see FIG. 3), or the like.

FIG. 6A shows a portion 110 of the reactor section 30 shown in FIG. 6. The reactor section 30 is made of a magnetic material, preferably carbon steel, as explained above. The axial and radial arrangement of the rare earth-focusing magnets 100, respectively indicated by reference numerals 102, 104, 106 and 108, creates strong radial fields that circulate through an annular passage within the portion 110 of the reactor section 30, and which subject fluids flowing through the annular passage to magnetic treatment. The focusing magnet 104 is located downstream from the focusing magnet 102 and radially opposite of the focusing magnet 102. The focusing magnet 106 is axially spaced from the focusing magnet 104 and located on the same side of the reactor section 30 as the focusing magnet 104. The focusing magnet 108, which is the farthest downstream, is axially spaced from the focusing magnet 106 and offset by more than 45° but less than 90° with respect to magnets 104 and 106. An offset of 67.5° has been determined to perform well in wells that produce water that is heavily laden with: dissolved minerals, including barium sulfate. The focusing magnets 102, 104, 106 and 108, are oriented with their north poles inwardly and south poles outwardly. The focusing magnets 102, 104, 106 and 108 are retained in pockets 114 connected to housing 101 of the section 100. The pockets 114 may be welded or threadedly connected to the housing 101.

FIG. 7 is a cross-sectional view taken along lines A—A of the portion 110 of the reactor section 30 shown in FIG. 6A. The focusing magnet 108, which has its north pole 118 oriented inwardly and south pole 120 oriented outwardly, is retained in a pocket 114 that is threaded to the reactor section 30. An arrow 122 illustrates a radial offset of the magnet 108 with respect to magnets 104 and 106.

FIG. 8 is a cross-sectional view taken along lines B—B of the portion 110 of the reactor section 30 shown in FIG. 6A. The focusing magnet 106, which has its north pole 118 oriented inwardly and south pole 120 oriented outwardly, is retained in a pocket 114 that is threaded to the reactor section 30. The focusing magnet 106 is located radially opposite and downstream of the magnet 102.

Experimental use of the reactor section 30 in accordance with the invention connected to the hydrocarbon section described above, for magnetically treating well fluids showed a positive result in inhibiting a deposition of barium sulfate in the production tubing 20. After a period of five month's use, production tubing in a well known to produce hydrocarbons high in barium sulfate were clean with no detectable deposit of barium sulfate or other mineral scale.

Although use of the apparatus 10 with focusing magnets 100 in accordance with the invention has been described with reference to downhole applications, it will be understood by those skilled in the art that the invention is not limited to such use. It may also be used in pipelines, conduits and tubing, either horizontal or vertical where the deposition of minerals such as barium sulfate is a problem.

Changes and modifications to the preferred embodiments described above will no doubt become apparent to persons skilled in the art. The scope of the invention is therefore intended to be limited solely by the scope of the appended claims.

We claim:

1. An apparatus for magnetically treating fluids flowing through a conduit to inhibit a deposition of barium sulfate and other mineral scales, comprising:

a first housing adapted to be coupled to one end to the tubing, the housing being of magnetic material;

a first elongated core magnet assembly supported and axially extending within the first housing so that an annular passage is formed between the elongated core magnet assembly and the first housing, the core magnet assembly including a plurality of magnets coaxially arranged in series, the magnets being grouped in pairs with opposite poles adjacent in each of the pairs, adjacent pairs having like poles adjacent, each of the pairs being spaced apart by a non-magnetic spacer; and a second housing downstream from the first housing, the second housing including a set of four focusing magnets respectively supported at an upstream end of an inner periphery of the second housing, a first, second and third of the magnets of the set being axially distributed along a first plane, and a fourth of the magnets being axially offset from the first, second and third magnets and oriented in a second plane that is offset more than 45° and less than 90° with respect to the first plane.

2. An apparatus as claimed in claim 1 wherein the first focus magnet is positioned opposite the second and third focusing magnets and located upstream of the second and third focusing magnets, which are axially spaced apart.

3. An apparatus as claimed in claim 2 wherein the fourth focus magnet is located downstream of the other focusing magnets.

4. An apparatus as claimed in claim 3 wherein the fourth focus magnet is offset by 67.5° from a plane of the first, second and third focusing magnets.

5. An apparatus as claimed in claim 1 wherein the first core magnet assembly comprises a first core housing retaining the magnets in the coaxial arrangement, the core housing being of non-magnetic material.

6. An apparatus as claimed in claim 5 wherein the first core magnet assembly further comprises a plurality of spacers each of which is made of magnetic material and is positioned between each of the pairs of magnets.

7. An apparatus as claimed in claim 6 wherein the first core magnet assembly comprises a plurality of hanger components that centralize the first core magnet assembly within the first housing.

8. An apparatus as claimed in claim 7 wherein the first core magnet assembly further includes a single magnet which is axially spaced from a first pair of the magnets on an upstream side with respect to a direction of flow of the fluids, the single magnet having a like pole oriented towards an adjacent pole of the first pair of the magnets.

9. An apparatus as claimed in claim 8 wherein the single magnet is supported within the first core housing and spaced from the adjacent first pair of magnets by a non-magnetic spacer.

10. An apparatus as claimed in claim 1 wherein the second housing further comprises:
    a second elongated magnet core assembly which extends axially within the second housing upstream of the focusing magnets, so that an annular passage is formed between the second core magnet assembly and the second housing, the second core assembly including at least two pairs of magnets arranged coaxially in series, with opposite poles adjacent in each of pairs and like poles adjacent between the two pairs, the two pairs being spaced apart by a non-magnetic spacer; and
    two focus magnets supported respectively at an inner periphery of the second housing upstream of the four focusing magnets, the two focusing magnets being diametrically spaced apart with a like pole of each of the magnets oriented towards each other, the two focusing magnets being located downstream of the second elongated magnet core assembly and upstream of the four focusing magnets.

11. An apparatus as claimed in claim 10 wherein a polarity of a pole of a magnet in the first core magnet assembly at the upstream end and a polarity of a pole of a magnet in the second core magnet assembly at the downstream end are the same as a polarity of each of the inwardly oriented poles of the focusing magnets.

12. An apparatus as claimed in claim 11 wherein the first and second core magnet assemblies comprise respectively a first and a second core housings, each of the core housings retaining the corresponding magnets in position the core housings being of non-magnetic material.

13. An apparatus as claimed in claim 12 wherein the second core magnet assembly includes a plurality of spacers, each of which is made of magnetic material and is positioned between each of the pairs of magnets.

14. An apparatus as claimed in claim 13 further comprising:
    a U-shaped retainer of magnetic material secured to the other end of the second housing and supporting the second core housing.

15. Apparatus as claimed in claim 14 further comprising a retaining ring secured with the first core housing and wedged between the first and second housing, being covered with a coupling which couples the first and second housing.

16. An apparatus as claimed in claim 10 wherein each of the focusing magnets is supported within a pocket which secured to the inner periphery of the second housing.

17. An apparatus for treating hydrocarbon and aqueous fluids within a downhole oil production tubing using permanent magnets to inhibit a deposit of barium sulfate within the production tubing, comprising:
    a first housing adapted to be coupled on one end to the tubing, the housing being made of magnetic material;
    a first elongated core magnet assembly supported and axially extending within the first housing so that an annular passage is formed between the elongated core magnet assembly and the first housing, the first core magnet assembly including a plurality of magnets coaxially arranged in series, the magnets being grouped in pairs with opposite poles adjacent in each of the pairs, adjacent pairs having like poles adjacent, each of the pairs being spaced apart by a non-magnetic spacer;
    a second housing which is made of magnetic material and coupled to an upstream end of the first housing, the opposite end thereof being adapted for an entry of the fluids to be treated;
    a second elongated magnet core assembly which extends axially within the second housing, so that an annular passage is formed between the second core magnet assembly and the second housing, the second core magnet assembly including at least two pairs of magnets arranged coaxially in series, with opposite poles adjacent in each of pairs and like poles adjacent between the two pairs, the two pairs being spaced apart by a non-magnetic spacer; and
    a set of four focusing magnets respectively supported at an upstream end of an inner periphery of the second housing, a first, second and third of the magnets of the set being axially distributed along a first plane, and a fourth of the magnets being axially offset from the first, second and third magnets and oriented in a second plane that is offset by more than 45° and less than 90° with respect to the first plane.

18. An apparatus as claimed in claim 17 further comprising a first set of two focusing magnets supported respectively at an inner periphery of the second housing, the two focusing magnets being diametrically spaced apart with a like pole of each of the magnets oriented towards each other, the two focusing magnets being located downstream of the second elongated magnet core assembly.

19. An apparatus as claimed in claim 18 further comprising:
    a U-shaped retainer of magnetic material secured to the other end of the second housing and supporting the second core housing; and
    a retaining ring secured with the first core housing and wedged between the first and second housing, being covered with a coupling which couples the first and second housing.

20. An apparatus as claimed 19 wherein each of the focusing magnets is supported within a pocket which secured to the second housing.

* * * * *